US012447409B2

(12) United States Patent
Osman et al.

(10) Patent No.: US 12,447,409 B2
(45) Date of Patent: Oct. 21, 2025

(54) REPORTING AND CROWD-SOURCED REVIEW WHETHER GAME ACTIVITY IS APPROPRIATE FOR USER

(71) Applicants: Sony Interactive Entertainment LLC, San Mateo, CA (US); Sony Interactive Entertainment Inc., Tokyo (JP)

(72) Inventors: Steven Osman, San Francisco, CA (US); Celeste Bean, San Francisco, CA (US)

(73) Assignees: Sony Interactive Entertainment LLC, San Mateo, CA (US); Sony Interactive Entertainment Inc., Tokyo (JP)

( * ) Notice: Subject to any disclaimer, the term of this patent is extended or adjusted under 35 U.S.C. 154(b) by 601 days.

(21) Appl. No.: 17/874,119

(22) Filed: Jul. 26, 2022

(65) Prior Publication Data

US 2024/0033643 A1 Feb. 1, 2024

(51) Int. Cl.

| | |
|---|---|
| ***A63F 13/75*** | (2014.01) |
| ***A63F 13/335*** | (2014.01) |
| ***A63F 13/79*** | (2014.01) |

(52) U.S. Cl.

CPC ............ *A63F 13/75* (2014.09); *A63F 13/335* (2014.09); *A63F 13/79* (2014.09)

(58) Field of Classification Search

CPC ......... A63F 13/79; A63F 13/335; A63F 13/75
USPC ............................................................ 463/42
See application file for complete search history.

(56) References Cited

U.S. PATENT DOCUMENTS

2013/0121591 A1* 5/2013 Hill ..................... G10L 15/1815 382/195
2016/0046298 A1* 2/2016 DeRuyck ............. B60K 28/066 340/576
2016/0267490 A1* 9/2016 Johnson ................. G07C 13/00
2021/0337222 A1 10/2021 Swaminathan et al.
2021/0370183 A1 12/2021 Dorn et al.
2021/0390832 A1* 12/2021 Jaramillo ............ G07F 17/3272
(Continued)

OTHER PUBLICATIONS

Oleszek, Walter, "Super-Majority Votes in the Senate", CRS Report for Congress, May 19, 2008 (Year: 2008).*
(Continued)

*Primary Examiner* — Michael A Cuff
(74) *Attorney, Agent, or Firm* — Kilpatrick Townsend & Stockton LLP

(57) ABSTRACT

A method performed for evaluating activity in a video game, including: executing a multi-player session of a video game; during the multi-player session, receiving flag event data from a first player device, the flag event data indicating that a first player has flagged a gameplay incident occurring during the multi-player session as potentially inappropriate; responsive to receiving the flag event data, then sending a request to a plurality of second player devices, wherein responsive to said request each of the plurality of second player devices renders a voting interface to obtain voting input from each of a plurality of second players regarding whether the gameplay incident is inappropriate; receiving said voting input from the plurality of second player devices, and responsive to said voting input identifying a threshold amount of the plurality of second players considering the gameplay incident to be inappropriate, then administering a penalty for the gameplay incident.

18 Claims, 6 Drawing Sheets

(56) References Cited

U.S. PATENT DOCUMENTS

| | | | | |
|---|---|---|---|---|
| 2021/0402304 | A1* | 12/2021 | Dorn ..................... | A63F 13/493 |
| 2022/0032199 | A1 | 2/2022 | Olga et al. | |
| 2022/0256164 | A1 | 8/2022 | Bond et al. | |
| 2023/0219007 | A1 | 7/2023 | Rudi et al. | |

OTHER PUBLICATIONS

PCT/US2023/069822, International Search Report and Written Opinion, ISA-210/ISA-237, European Patent Office, NL 2280 HV Rijswijk., Oct. 12, 2023.

* cited by examiner

REPORTING AND CROWD-SOURCED REVIEW WHETHER GAME ACTIVITY IS APPROPRIATE FOR USER

BACKGROUND

1. Field of the Disclosure

The present disclosure relates generally to reporting and crowd-sourced review of whether game activity is appropriate for users of a video game.

2. Description of the Related Art

The video game industry has seen many changes over the years. As technology advances, video games continue to achieve greater immersion through sophisticated graphics, realistic sounds, engaging soundtracks, haptics, etc. Players are able to enjoy immersive gaming experiences in which they participate and engage in virtual environments, and new ways of interaction are sought.

It is in this context that implementations of the disclosure arise.

SUMMARY

Implementations of the present disclosure include methods, systems, and devices relating to reporting and crowd-sourced review of whether game activity is appropriate for users of a video game.

In some implementations, a method performed by at least one server computer is provided for evaluating activity in a video game, including: executing a multi-player session of a video game; during the multi-player session, receiving flag event data from a first player device associated to a first player of the multi-player session, the flag event data indicating that the first player has flagged a gameplay incident occurring during the multi-player session as potentially inappropriate; responsive to receiving the flag event data, then sending a request to a plurality of second player devices respectively associated to a plurality of second players of the multi-player session, wherein responsive to said request each of the plurality of second player devices renders a voting interface to obtain voting input from each of the plurality of second players regarding whether the gameplay incident is considered to be inappropriate; receiving said voting input from the plurality of second player devices, and responsive to said voting input identifying a threshold amount of the plurality of second players considering the gameplay incident to be inappropriate, then administering a penalty related to the gameplay incident.

In some implementations, the method further includes: recording gameplay video rendered for the first player during the multi-player session; selecting a portion of the gameplay video based on the flag event data; wherein the voting interface is configured to present the portion of the gameplay video for viewing by each of the plurality of second players.

In some implementations, the flag event data identifies a time point in the multi-player session at which the first player flagged the gameplay incident; wherein selecting the portion of the gameplay video is configured to identify a predefined amount of the gameplay video immediately preceding the time point.

In some implementations, the method further includes: determining a location of the gameplay incident in a virtual environment; selecting the plurality of second player devices to receive the request based on a proximity of gameplay by the plurality of second players to the location of the gameplay incident.

In some implementations, the proximity of gameplay is defined by a location of respective avatars of the second players being within a predefined distance of the location of the gameplay incident in the virtual environment.

In some implementations, the plurality of second player devices are selected to receive the request based on identifying the plurality of second players as having viewed the gameplay incident during the multi-player session.

In some implementations, identifying the plurality of second players includes determining view directions of the plurality of second players that are approximately towards a location of the gameplay incident at a time of the gameplay incident.

In some implementations, the flag event data is configured to identify a third player of the multi-player session that committed the gameplay incident.

In some implementations, the penalty is administered against the third player.

In some implementations, the penalty is defined by one or more of loss of a resource in the video game, loss of an achievement in the video game, or exclusion from a future multi-player session of the video game.

In some implementations, a non-transitory computer readable medium having program instructions embodied thereon, said program instruction being configured, when executed by at least one server computer, to cause said at least one server computer to perform a method for evaluating activity in a video game including the following operations: executing a multi-player session of a video game; during the multi-player session, receiving flag event data from a first player device associated to a first player of the multi-player session, the flag event data indicating that the first player has flagged a gameplay incident occurring during the multi-player session as potentially inappropriate; responsive to receiving the flag event data, then sending a request to a plurality of second player devices respectively associated to a plurality of second players of the multi-player session, wherein responsive to said request each of the plurality of second player devices renders a voting interface to obtain voting input from each of the plurality of second players regarding whether the gameplay incident is considered to be inappropriate; receiving said voting input from the plurality of second player devices, and responsive to said voting input identifying a threshold amount of the plurality of second players considering the gameplay incident to be inappropriate, then administering a penalty related to the gameplay incident.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

The following implementations of the present disclosure provide methods, systems, and devices for reporting and crowd-sourced review of whether game activity is appropriate for users of a video game.

Broadly speaking, implementations of the present disclosure are drawn to methods and systems for enabling players in a multi-player video game to handle inappropriate behavior in a self-guided manner. In some implementations, one user initiates a flag for some perceived inappropriate activity, and other users who have witnessed the game activity can vote to confirm if the game activity was inappropriate. Further, a previous amount (e.g. last 30 seconds) of gameplay prior to when the flag was initiated can be identified, for providing proof of the inappropriate game activity.

In this manner, the players engaged in the multi-player gameplay are able to collectively control what is deemed to be inappropriate behavior for their particular session. For a given flagging incident, a level of fairness is provided in that players other than those involved in the incident vote to determine whether there was inappropriate activity. Further, it will be appreciated that a group of players in one session may vote differently than a group of players in another session, and thus different sessions may effectively have different standards regarding what constitutes inappropriate gaming activity. Thus, methods and systems of the present disclosure enable improved fairness in gaming while allowing for variation in behavioral standards from one session to another.

With the above overview in mind, the following provides several example figures to facilitate understanding of the example embodiments.

Figure 1:
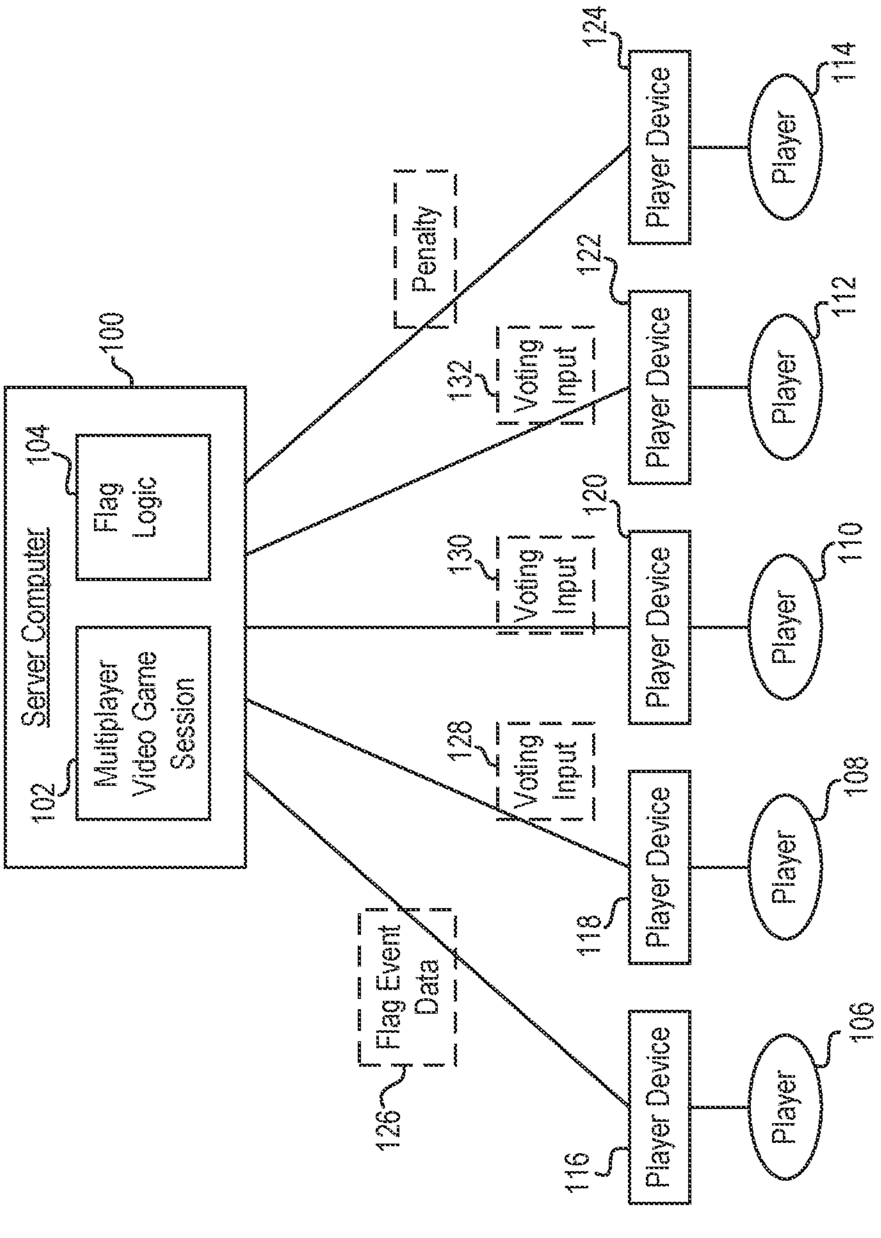
FIG. 1 conceptually illustrates a system for evaluating activity in a video game, in accordance with implementations of the disclosure.

FIG. 1 conceptually illustrates a system for evaluating activity in a video game, in accordance with implementations of the disclosure.

In the illustrated implementation, a server computer 100 executes a multi-player session 102 of a video game that enables multi-player gameplay of the video game. The players 106, 108, 110, 112, and 114 engage in gameplay of the multi-player session, via respective player devices 116, 118, 120, 122, and 124. Broadly speaking, a given player device is a computer or other device capable of communicating, over a network such as the Internet, with the server computer 100 to transmit data to, and receive data from, the multi-player session 102. By way of example without limitation, a player device can be a personal computer, gaming console, laptop computer, tablet, cellular phone, mobile device, head-mounted display (HMD, or virtual reality (VR) headset), set-top box, portable gaming device, etc. A given player device may be connected to a display (e.g. television, LCD/LED display, monitor, projector, etc.) for presentation of gameplay video content thereon. A given player device may also be connected to a controller device operated by a respective player to provide player input/commands for the video game.

In some implementations, the video game is cloud-executed by the server computer, for example, such that the multi-player session 102 performs execution of the game engine and rendering of gameplay video for each of the player devices, the gameplay video being streamed over the network to the player devices. In other implementations, the video game is at least partially executed by the player devices, with the multi-player session 102 handling coordination of events and game state data across the various player devices to ensure proper synchronization.

To handle gameplay behavioral issues and/or inappropriate activity, the server computer 100 further implements flag logic 104, which can be executed as part of the session 102 in some implementations. Generally, a player that believes certain gameplay or game activity is inappropriate may flag the activity as inappropriate, such as by pressing a button on their controller device or through some other selection/input mechanism (e.g. upon the occurrence or immediately after such activity or the recognition thereof). For example, in the illustrated implementation, upon flagging the gameplay incident, then flag event data 126 is generated at the player device 116 and transmitted to the flag logic 104. The flag event data indicates that the player 106 has flagged a gameplay incident occurring during the multi-player session 102 as potentially inappropriate.

It will be appreciated that to enable flagging of a gameplay incident, the player device 116 may present a flagging interface enabling the player 106 to set flags and provide details regarding what is being flagged as potentially inappropriate. For example, in some implementations, the player 106 can identify a specific player or players to be flagged as causing or performing the allegedly inappropriate game activity. For example, in the illustrated implementation, the player 106 may identify player 114 as having committed the allegedly inappropriate game activity. In some implementations, an interface is provided for entry of text, such as via a keyboard or voice recognition, whereby the player 106 may enter a description of the allegedly inappropriate activity. In some implementations, a menu of possible types of inappropriate activity is provided from which the player 106 may select to associate with the flag. In some implementations, the player 106 can select a portion of their gameplay video to associate with a flag, such as selecting an amount of time prior to the setting or triggering of the flag.

It will be appreciated that various kinds of gameplay activity can be flagged, including by way of example without limitation, player actions, player speech, player text input, gameplay inputs/commands/actions, etc.

In some implementations, the flag event data identifies or includes a time point in the multi-player session at which the flag was triggered or set by the player 106. It will be appreciated that such a time point can identify the time of the gameplay or the time of progression of the game state of the multi-player session of the video game when the flag was triggered. Accordingly, each player's gameplay video can be recorded and the time point can be used to identify relevant portion of each player's gameplay video, such as a portion immediately prior the time of the flag being triggered. In a cloud gaming implementation the gameplay video can be cloud recorded, whereas in a locally executed implementation gameplay video can be recorded by player devices, and uploaded and distributed to other player devices as needed in accordance with implementations described herein utilizing such gameplay video. In some implementations, the game state progression is recorded, and the recorded game state can be used to re-render the flagged incident from a novel perspective or from a perspective controlled by a given player viewing the flagged incident. Such video can be presented in a voting interface as described below.

Responsive to receiving the flag event data 126 then the flag logic 104 initiates a process whereby players vote to determine whether the flagged incident is actually inappropriate. In some implementations, a request is sent to the players that are eligible to vote to obtain their voting input regarding whether they believe the flagged incident is actually inappropriate or not. For example, in some implementations, players are eligible to vote if they participated in the session and are neither of the player initiating the flag or a player that is accused of performing activity being flagged. In other implementations, all players are eligible to vote. The request is made to the player devices of the eligible players. For example, in the illustrated implementation, players 108, 110, and 112 are eligible to vote, and therefore the request is sent to respective player devices 118, 120, and 122.

Upon receipt of the requests for voting input, then the player devices 118, 120, and 122 present a voting interface to their respective players 108, 110, and 112, to obtain their voting input. For example, the voting interface may include a message asking the player whether they think the flagged gaming activity is inappropriate and/or whether they think an accused player engaged in inappropriate behavior/activity. In some implementations, the voting interface presents a video of the allegedly inappropriate activity. For example, the voting interface may present a predefined amount of gameplay video, such as the previous 10, 15, 20, 30, 45, or 60 seconds of gameplay immediately prior to the setting of the flag, by way of example without limitation.

In some implementations, the gameplay video presented is that of the player that set the flag. In some implementations, the gameplay video presented is that of the player receiving the request for voting input. In some implementations, if a specific player is accused of, or otherwise involved in, the allegedly inappropriate gaming activity, then gameplay video of that accused or involved player is presented. In some implementations, gameplay video from multiple players is presented, such as gameplay video of the player that set the flag and gameplay video of an accused/involved player. In this manner, a voting player may evaluate the incident from multiple perspectives.

In some implementations, the recorded video could also have a transcription of the chat(s) that were happening. This can be particularly important in a situation where many people are speaking at once. It will be appreciated that since each player's audio can be recorded separately, it is likely possible to determine what each player is saying separately, before it is all mixed, and thereby perform a better transcription than would be possible when all the player audio is mixed together as there may be many people talking over each other which would make it harder to transcribe. Thus, in some implementations, player audio is separately/individually recorded and transcribed on an individual basis. The transcript can help judge whether the behavior was inappropriate. For example, a player may say something suggesting inappropriate behavior, such as "check this out, I can cheat here" right before they do it, and so a transcript can help identify the inappropriate behavior. In some implementations, the transcript could also be translated to the language of the individual voting players so they can understand.

The voting interface can include instructions regarding how to cast a vote to provide voting input, such as by instructing the voting player to press certain buttons on a controller device to indicate whether they think the flagged activity is actually inappropriate. For example, a first button can be pressed to indicate yes, and a second button can be pressed to indicate no.

Upon receiving the voting input from the player devices that received the request for voting input, then it is determined whether a threshold amount of the voting players considered the gameplay incident to be inappropriate. For example, in some implementations, if a majority of the voting players provide voting input indicating that they consider the gameplay incident to be inappropriate, then the gameplay incident is deemed to be inappropriate. In some implementations, if half or more of the voting players provide such voting input, then the incident is deemed to be inappropriate.

In some implementations, if the gameplay incident is deemed to constitute inappropriate behavior, then a penalty may be assessed. For example, if a player is accused of acting inappropriately, such as the player 114 in the illustrated implementation, then the penalty may be assessed against the player 114 specifically. In some implementations, the penalty is assessed against a team or other group of players. Examples of penalties can include loss of a game resource (e.g. energy, ammunition, health, stamina, currency, etc.), loss of game achievement progress/level (e.g. points, badges, medals, rankings, status, etc.), exclusion from a future session, a handicap in a future session, etc.

It will be appreciated that in some implementations, when a flag is triggered, then the voting process is carried out at the conclusion of the session, so as not to interrupt the gameplay. However, in other implementations, the voting process is carried out substantially immediately upon the triggering of the flag, pausing the gameplay while the voting process is carried out. In some implementations, the gameplay activity is monitored and the voting process is carried out when a break in the gameplay is detected (e.g. when player activity levels fall below a predefined threshold, such as defined by avatar movement, combat/weapons activity, player communications, reaching the end of a stage/chapter/section/level/boss fight, etc.).

In some implementations, the concept of flagging can be extended to flagging of game content itself (as opposed to actions performed by any particular user). And thus the appropriateness of game content can be evaluated by the players, and this can be provided as feedback to the game developers regarding the appropriateness of the content of the video game. In some implementations, the above-described flag logic is configured to provide such results of flagged game content to the game developers.

In some implementations, flagging can be age specific. For example, activity/content can be flagged as inappropriate for a child, but appropriate for an adult, and players may vote regarding whether this is a proper assessment. In some implementations, voting can be configured to enable distinguishing between appropriateness for adults versus children. For example, the voting interface can allow a player to indicate whether the flagged activity/content is appropriate for adults and separately whether it is appropriate for children.

It will be appreciated that the flagging and reporting system itself is potentially a mechanism for cheating. For instance, an opponent who is asked to vote may see one's video gameplay and know where they are located in the game's virtual environment. Additionally, one can use this to share information that one's teammates are not (yet) supposed to know. Thus, in various implementations the reporting and voting process can be configured to alleviate such problems.

For example, in some implementations, in a multi-player gameplay scenario between multiple teams, only one's teammates are selected for the vote so as not to give opponents undue information. In some implementations, the vote may result in terminating the gameplay session since sharing of recordings could give out hints to either friends or foes. In some implementations, limitations are placed on how frequently one may initiate flagging/voting. For example, there may be a cooldown period following a flagging/voting instance, so that a threshold amount of time is required before another flagging/voting instance is allowed. In some implementations, players are not able to initiate flagging/voting every single gaming session, but are limited to some number of reports per period of time.

In some implementations, the voting process is performed through other devices rather than the player's gaming devices. For instance, in some implementations, the vote request is sent to players' mobile phones, tablets, laptops, etc. so as not to interrupt the primary gameplay function of the main gaming devices.

In some implementations, players may have their votes weighted disproportionately based on factors such as experience or reputation. For example, in some implementations, players with higher levels of experience or higher reputations may have their votes weighted more highly than those with lower levels of experience or lower reputations. For example, reputation can be determined through a system of reputation points that players are able to give to each other. Thus, for example, a player that has shown a pattern of harassing through votes would be expected to have a lower reputation than a player that has garnered a reputation for reliable votes, and accordingly, the player with the lower reputation would have a lower weight assigned to their vote.

Figure 2:
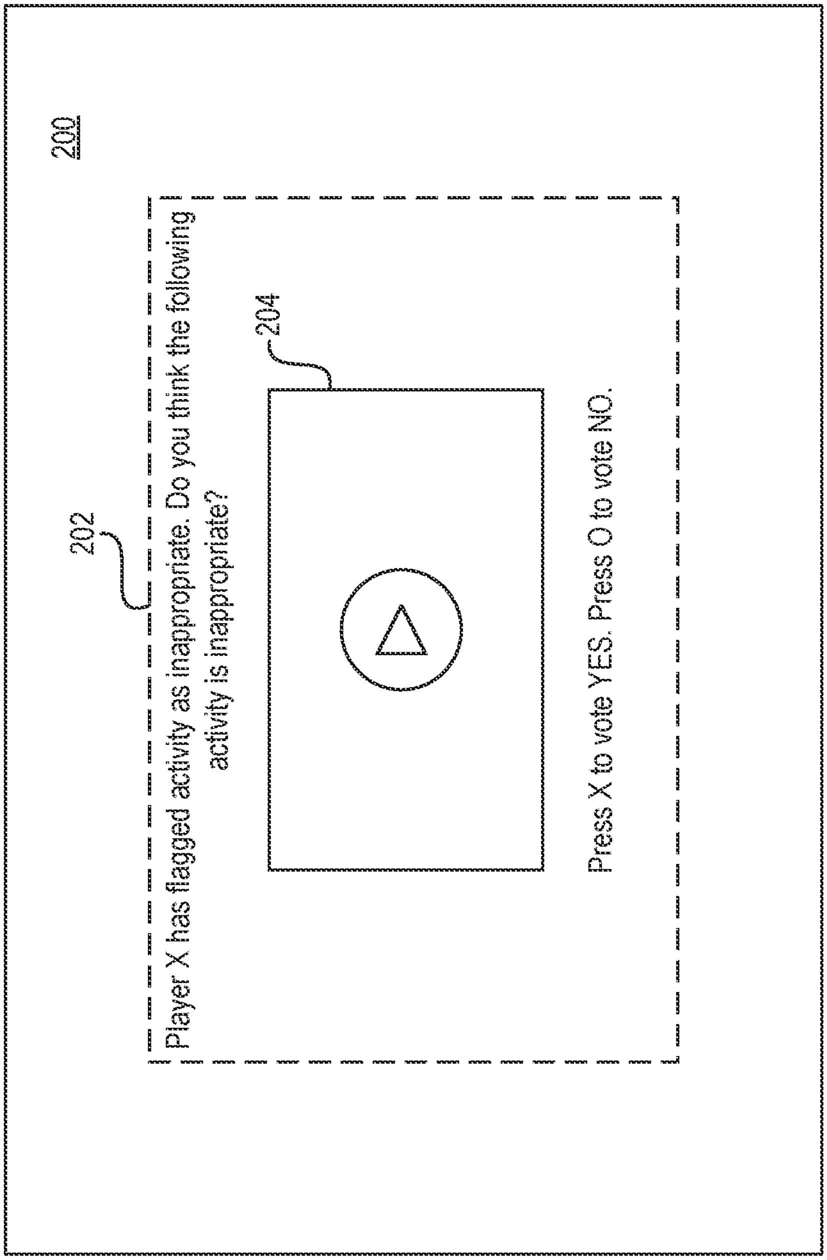
FIG. 2 conceptually illustrates a voting interface for enabling a player to vote regarding a flagging incident, in accordance with implementations of the disclosure.

FIG. 2 conceptually illustrates a voting interface for enabling a player to vote regarding a flagging incident, in accordance with implementations of the disclosure.

In the illustrated implementation, a game screen 200 is shown, over which a voting interface 202 is presented. For example, the game screen 200 can be the paused gameplay of the current session, while the voting interface 202 is presented to enable the voting to occur. In some implementations, the voting interface 202 is presented as an overlay over the game screen 200.

As shown, the voting interface 202 presents to the viewing player a message indicating that a certain player has flagged some gaming activity as inappropriate, and asks the viewing player to indicate whether they think the flagged activity is inappropriate. The message of the voting interface 202 further indicates how to vote, in this case by pressing a button to vote YES, and pressing another button to vote NO.

In the illustrated implementation, the voting interface 202 further includes presentation of a video 204. As noted above, such a video 204 can be that of the player that set the flag, or another player as previously described. In some implementations, the video 204 is a re-rendering of the gameplay showing the flagged incident from a novel perspective or controllable by the viewing player as described above.

Figure 3:
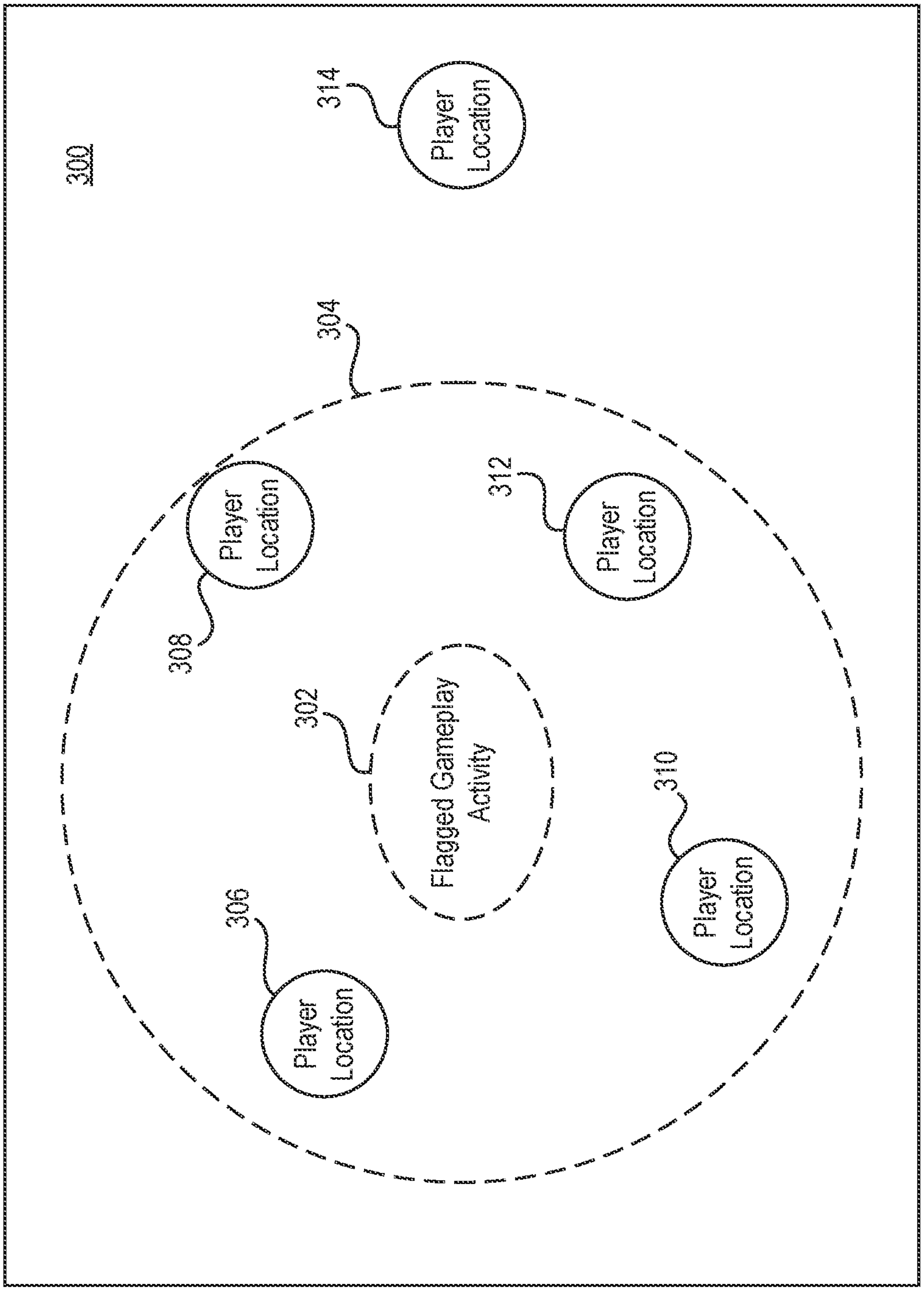
FIG. 3 conceptually illustrates identification of players eligible to participate in voting regarding flagged game activity based on location, in accordance with implementations of the disclosure.

FIG. 3 conceptually illustrates identification of players eligible to participate in voting regarding flagged game activity based on location, in accordance with implementations of the disclosure.

In the illustrated implementation, a virtual environment 300 of a multi-player session of a video game is conceptually shown. Within the virtual environment 300, a player flags certain gameplay activity 302 as inappropriate. It will be appreciated that the flagged gameplay activity 302 occurs at a location within the virtual environment 300 as conceptually shown.

To determine which players are eligible to vote regarding whether the flagged activity is actually inappropriate, in some implementations, player proximity to the flagged gameplay activity 302 is considered. For example, in some implementations, players having a location (e.g. location of an avatar or representative entity of the player or controlled by the player, or position of the player's gameplay within the virtual environment) within a region 304 proximate to the flagged gameplay activity 302, are eligible to vote, whereas players outside the proximate region 304 are ineligible to vote. Thus, in the illustrated implementation, there are players having locations 306, 308, 310, and 312 within the proximate region 304 at the time of the flagged gameplay activity 302, and these players are eligible to vote. Whereas a player having a player location 314 outside the proximate region 304 at the time of the flagged gameplay activity 302 is not eligible to vote. It will be appreciated that the eligible players will receive requests to vote or provide feedback regarding whether they consider the flagged activity to be inappropriate, as described above.

In some implementations, the proximate region 304 is at least partially defined by a predefined distance/radius from the flagged gameplay activity 302. For example, players falling within the predefined distance/radius are eligible to vote.

In support of the presently described embodiment, in some implementations, when a flag is triggered, then the locations of the players, at the time of the flag and/or during a time period prior to the flag, are captured and/or analyzed to enable determination of which players are eligible to vote.

Figure 4:
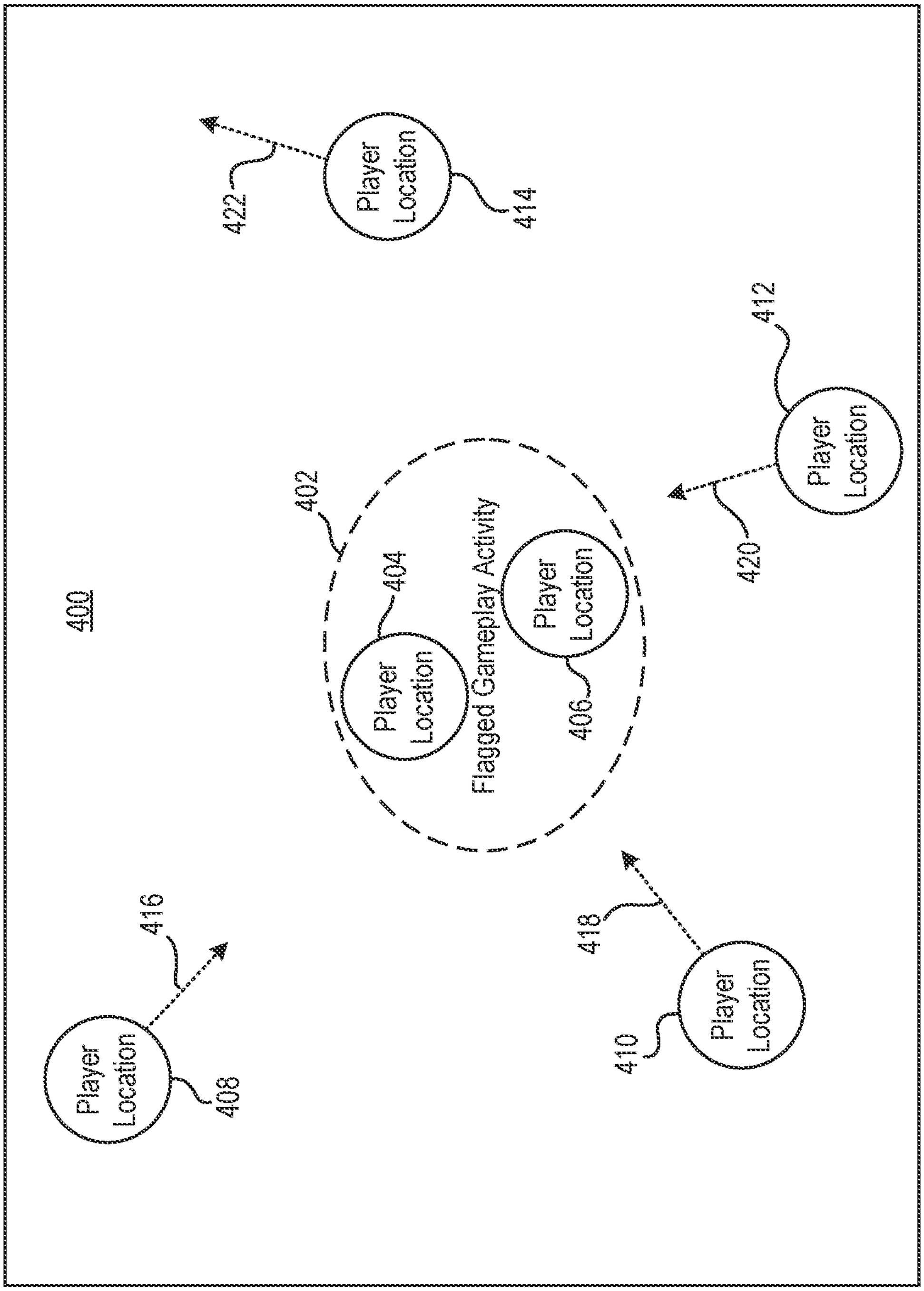
FIG. 4 conceptually illustrates identification of players eligible to participate in voting regarding flagged game activity based on player view, in accordance with implementations of the disclosure.

FIG. 4 conceptually illustrates identification of players eligible to participate in voting regarding flagged game activity based on player view, in accordance with implementations of the disclosure.

It will be appreciated that it can be desirable to determine which players viewed certain flagged gaming activity, and to have such players vote regarding the inappropriateness of the flagged gaming activity. In the illustrated implementation, a virtual environment 400 of a multi-player session of a video game is conceptually shown. Within the virtual environment 400, flagged gameplay activity 402 is shown involving players having locations 404 and 406 as shown.

In some implementations, player view at the time of the flagged gameplay activity 402 is considered in determining eligibility to vote. For example, in the illustrated implementation, players having locations 408, 410, and 412 have player views and/or view directions 416, 418, and 420, respectively, that are approximately towards and/or including the flagged gameplay activity 402, and thus these players are eligible to vote. Whereas a player having a location 414 has a view or view direction 422 directed away from and/or not including the flagged gameplay activity 402, and is therefore not eligible to vote.

In some implementations, the players' views are determined/captured in response to triggering of a flag, and used to at least partially determine eligibility to participate in voting regarding whether the flagged gameplay activity should be deemed inappropriate.

Figure 5:
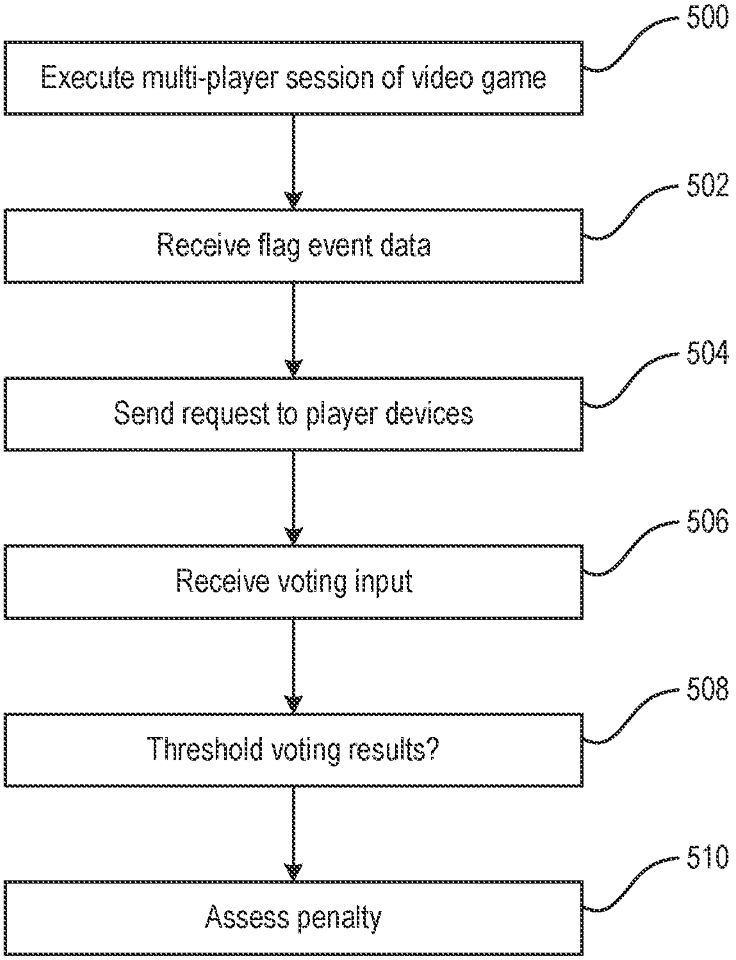
FIG. 5 conceptually illustrates a method for evaluating activity in a video game, in accordance with implementations of the disclosure.

FIG. 5 conceptually illustrates a method for evaluating activity in a video game, in accordance with implementations of the disclosure.

At method operation 500, a multi-player session of a video game is executed. At method operation 502, flag event data is received indicating that a gameplay incident occurring during the session has been flagged as potentially inappropriate by a first player. At method operation 504, then responsive to receiving the flag event data, a request is sent to a plurality of second player devices respectively associated to a plurality of second players of the multi-player session, and responsive to the request each of the plurality of second player devices renders a voting interface to obtain voting input from each of the plurality of second players regarding whether the gameplay incident is considered to be inappropriate. At method operation 506, the voting input is received from the plurality of second player devices. At method operation 508, it is determined whether the received voting input identifies a threshold amount of the plurality of second players considering the gameplay incident to be inappropriate. And if so, then at method operation 510, a penalty related to the gameplay incident is administered.

Figure 6:
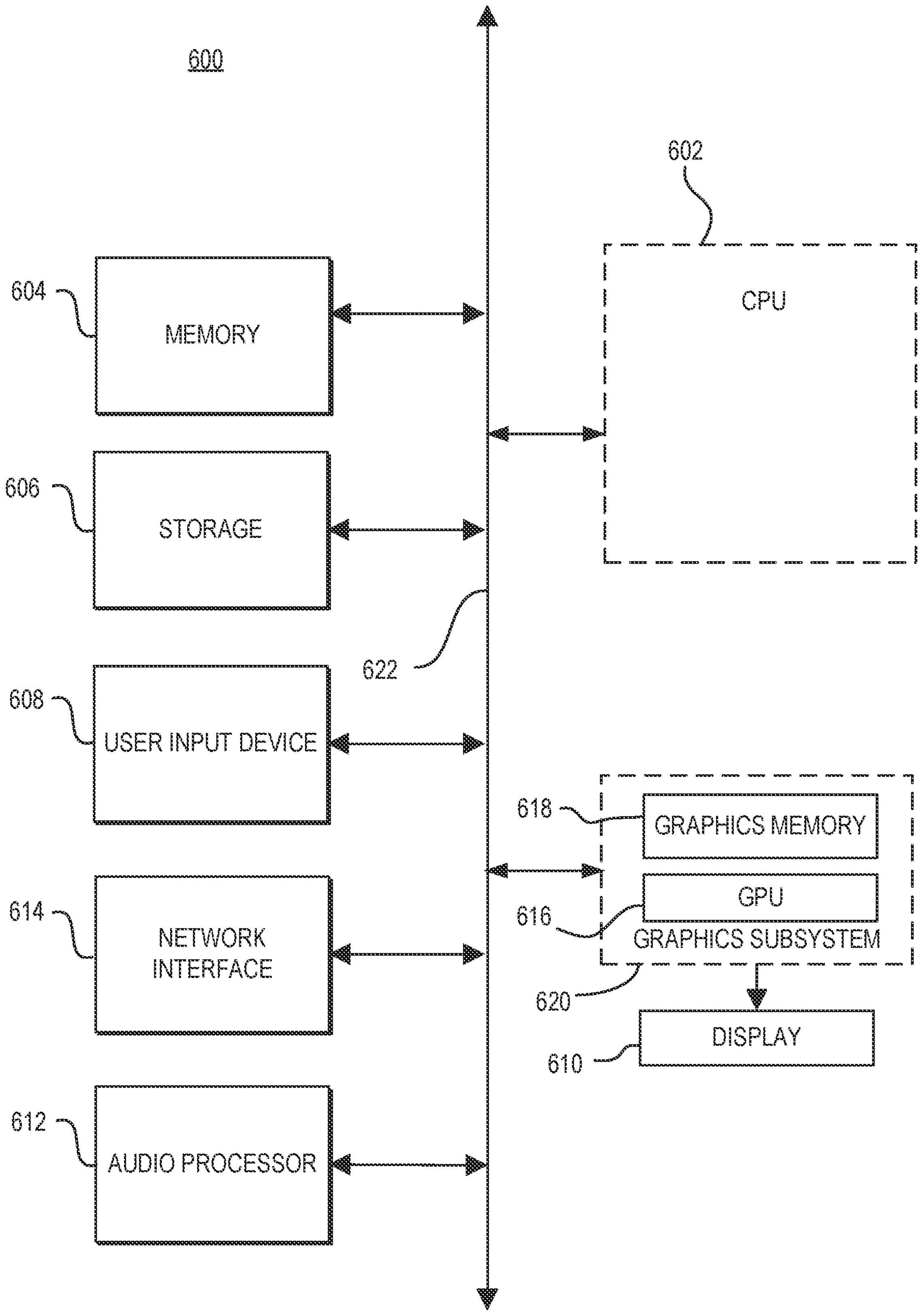
FIG. 6 illustrates components of an example device that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method performed by at least one server computer for evaluating activity in a video game, comprising:

executing a multi-player session of a video game;

during the multi-player session, receiving flag event data from a first player device associated to a first player of the multi-player session, the flag event data indicating that the first player has flagged a gameplay incident occurring during the multi-player session as potentially inappropriate;

determining a location of the gameplay incident in a virtual environment;

selecting a plurality of second player devices to receive a request based on a proximity of gameplay by a plurality of second players to the location of the gameplay incident;

responsive to receiving the flag event data, then sending a request to the plurality of second player devices respectively associated to a plurality of second players of the multi-player session, wherein responsive to said request each of the plurality of second player devices renders a voting interface to obtain voting input from each of the plurality of second players regarding whether the gameplay incident is considered to be inappropriate; and receiving said voting input from the plurality of second player devices, and responsive to said voting input identifying a threshold amount of the plurality of second players considering the gameplay incident to be inappropriate, then administering a penalty related to the gameplay incident.

2. The method of claim 1, further comprising:

recording gameplay video rendered for the first player during the multi-player session;

selecting a portion of the gameplay video based on the flag event data;

wherein the voting interface is configured to present the portion of the gameplay video for viewing by each of the plurality of second players.

3. The method of claim 2, wherein the flag event data identifies a time point in the multi-player session at which the first player flagged the gameplay incident;

wherein selecting the portion of the gameplay video is configured to identify a predefined amount of the gameplay video immediately preceding the time point.

4. The method of claim 1, wherein the proximity of gameplay is defined by a location of respective avatars of the second players being within a predefined distance of the location of the gameplay incident in the virtual environment.

5. The method of claim 1, wherein the plurality of second player devices are selected to receive the request based on identifying the plurality of second players as having viewed the gameplay incident during the multi-player session.

6. The method of claim 1, wherein identifying the plurality of second players includes determining view directions of the plurality of second players that are approximately towards a location of the gameplay incident at a time of the gameplay incident.

7. The method of claim 1, wherein the flag event data is configured to identify a third player of the multi-player session that committed the gameplay incident.

8. The method of claim 7, wherein the penalty is administered against the third player.

9. The method of claim 8, wherein the penalty is defined by one or more of loss of a resource in the video game, loss of an achievement in the video game, or exclusion from a future multi-player session of the video game.

10. A non-transitory computer readable medium having program instructions embodied thereon, said program instruction being configured, when executed by at least one server computer, to cause said at least one server computer to perform a method for evaluating activity in a video game including the following operations:

executing a multi-player session of a video game;

during the multi-player session, receiving flag event data from a first player device associated to a first player of the multi-player session, the flag event data indicating that the first player has flagged a gameplay incident occurring during the multi-player session as potentially inappropriate;

determining a location of the gameplay incident in a virtual environment;

selecting a plurality of second player devices to receive a request based on a proximity of gameplay by a plurality of second players to the location of the gameplay incident;

responsive to receiving the flag event data, then sending a request to a plurality of second player devices respectively associated to a plurality of second players of the multi-player session, wherein responsive to said request each of the plurality of second player devices renders a voting interface to obtain voting input from each of the plurality of second players regarding whether the gameplay incident is considered to be inappropriate;

receiving said voting input from the plurality of second player devices, and responsive to said voting input identifying a threshold amount of the plurality of second players considering the gameplay incident to be inappropriate, then administering a penalty related to the gameplay incident.

11. The non-transitory computer readable medium of claim 10, wherein the operations further include:

recording gameplay video rendered for the first player during the multi-player session;

selecting a portion of the gameplay video based on the flag event data;

wherein the voting interface is configured to present the portion of the gameplay video for viewing by each of the plurality of second players.

12. The non-transitory computer readable medium of claim 11, wherein the flag event data identifies a time point in the multi-player session at which the first player flagged the gameplay incident;

wherein selecting the portion of the gameplay video is configured to identify a predefined amount of the gameplay video immediately preceding the time point.

13. The non-transitory computer readable medium of claim 10, wherein the proximity of gameplay is defined by a location of respective avatars of the second players being within a predefined distance of the location of the gameplay incident in the virtual environment.

14. The non-transitory computer readable medium of claim 10, wherein the plurality of second player devices are selected to receive the request based on identifying the plurality of second players as having viewed the gameplay incident during the multi-player session.

15. The non-transitory computer readable medium of claim 10, wherein identifying the plurality of second players includes determining view directions of the plurality of second players that are approximately towards a location of the gameplay incident at a time of the gameplay incident.

16. The non-transitory computer readable medium of claim 10, wherein the flag event data is configured to identify a third player of the multi-player session that committed the gameplay incident.

17. The non-transitory computer readable medium of claim 16, wherein the penalty is administered against the third player.

18. The non-transitory computer readable medium of claim 17, wherein the penalty is defined by one or more of loss of a resource in the video game, loss of an achievement in the video game, or exclusion from a future multi-player session of the video game.

* * * * *